(No Model.)
F. BAIRD.
ANIMAL TRAP.
No. 509,995.  Patented Dec. 5, 1893.
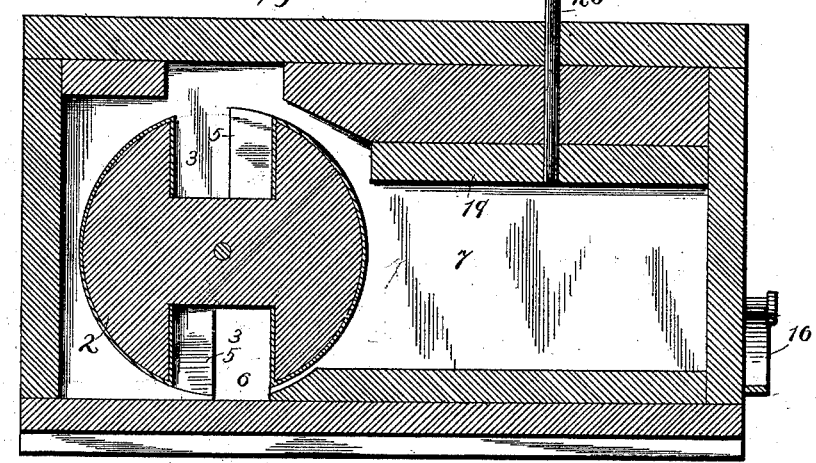
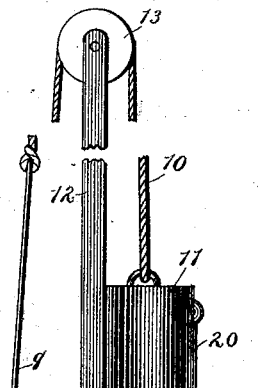
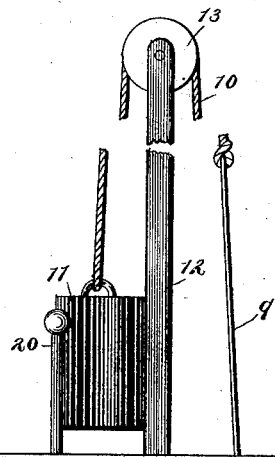
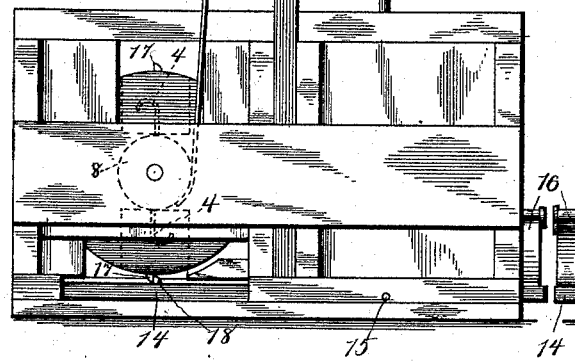
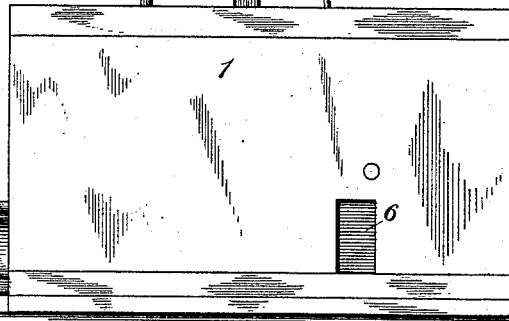
Witnesses
C. S. Frye
Inventor
Fed Baird
By Hopkins & Atkins
Attorneys

UNITED STATES PATENT OFFICE.

FED BAIRD, OF GASBURG, VIRGINIA.

ANIMAL-TRAP.

SPECIFICATION forming part of Letters Patent No. 509,995, dated December 5, 1893.

Application filed January 19, 1893. Serial No. 459,022. (No model.)

*To all whom it may concern:*

Be it known that I, FED BAIRD, of Gasburg, Brunswick county, and State of Virginia, have invented certain new and useful Improvements in Animal-Traps, of which the following is a specification, reference being had to the accompanying drawings.

The object of my invention is to produce an improved trap for catching an animal, conveying it to a chamber completely separated from the trap, and providing means therein for executing it with facility and expedition.

In the accompanying drawings, Figure 1 is a side elevation of my trap. Fig. 2 is a view of the opposite side. Fig. 3 is a central vertical longitudinal section of the same.

Referring to the figures on the drawings, 1 indicates a box carrying in one end trapping mechanism consisting preferably of a roller 2 that is supported in suitable bearings in the box. This roller is preferably provided with metallic armor protecting it against the gnawing of entrapped animals, and is provided with longitudinal recesses 3, from the tops of which depend bait hooks 4. These recesses are preferably half closed at one end by a door plate or knives 5, whereby, in the event of the animal being in a position to prevent the rotation of the roller when trapped, he will be mortally wounded by the knives. When in the lower position they stand opposite an entrance 6 in one side of the box.

7 indicates a chamber completely separated from the entrance by the roller. The roller is designed to be rotated at intervals by any suitable means, as for example a counterweighted pulley rope. For this purpose it is provided at one end with a pulley 8 to which a band 9 is fastened, and around which it is adapted to be wrapped, so that a pull upon it will impart rotation to the roller. A cord 10 is secured to the end of the strap at one end, and is fastened at the other end to a counterweight 11.

12 indicates a standard provided at its upper end with a pulley 13, over which the cord 10 passes. When the strap has been wrapped around the pulley 8, and the roller is free to revolve the counterweight will immediately impart rotation to the pulley and thereby drive the roller.

Any suitable roller-actuating mechanism may be substituted for the simple device herein illustrated.

To hold the recesses in the roller opposite to the entrance for certain intervals, I provide suitable tripping mechanism in combination with the roller, which preferably consists of a trigger 14, which is pivoted in the bottom of the box, as indicated at 15, and which in fact constitutes a false bottom. It is held normally in place by a spring 16. The roller is provided on one end, opposite the entrance and in line with the recesses, with pins or projections 17. In the line of these pins is provided a similar projection 18 upon the trigger, adapted when the trigger is actuated by its spring to engage with one of the projections upon the roller and prevent the rotation of the roller.

In operation, suppose that an animal enters the entrance and one of the recesses in the roller, being tempted by the bait which is secured over the trigger, it advances until it, stepping upon the trigger, releases the roller, which, performing a half revolution, swings it into the chamber 7 where it is confined. The roller meantime having made its half revolution is arrested by the impinging of the projection 17 upon its periphery with the projection upon the trigger. In this way the trap automatically sets itself after each trapping operation.

For convenience of dispatching the victim after it has been incarcerated in the chamber, I provide a plunger 19 having a stem 20 projecting through the top of the box. By means of this it may be crushed without danger of releasing it.

What I claim is—

1. In a trap, the combination with a box having an entrance, of a roller provided with longitudinal grooves, adapted to be successively held in juxtaposition with the entrance, of door plates or knives partially covering the ends of the grooves adjacent to said entrance, and mechanism adapted to rotate said roller, substantially as specified.

2. In a trap, the combination with a box provided with an entrance and rotary trapper, of a crusher vertically movable in the box back of the roller adapted to crush the entrapped animal when it is thrown into the box or chamber by the rotation of the rotary trapper and its escape has been prevented thereby, substantially as set forth.

3. In a trap, the combination with a box, of a rotary trapper provided with a metallic guard on such of its surface as is exposed to the attack of the entrapped animal, and transverse knives at its ends, substantially as set forth.

In testimony of all which I have hereunto subscribed my name.

FED $\overset{\text{his}}{\times}$ BAIRD.
mark

Witnesses:
W. H. VALENTINE,
JNO. W. PALMER.